US012675724B1

(12) United States Patent
    Carcamo

(10) Patent No.: US 12,675,724 B1
(45) Date of Patent: Jul. 7, 2026

(54) QUANTUM COMPUTING SYSTEM WITH ADVANCED NEURAL NETWORK FOR PREDICTIVE ERROR CORRECTION

(71) Applicant: Quantumgraph Technologies LLC, Coral Gables, FL (US)

(72) Inventor: Arturo Hernan Carcamo, Caba (AR)

(73) Assignee: Quantumgraph Technologies LLC, Coral Gables, FL (US)

( * ) Notice: Subject to any disclaimer, the term of this patent is extended or adjusted under 35 U.S.C. 154(b) by 64 days.

(21) Appl. No.: 18/906,656

(22) Filed: Oct. 4, 2024

Related U.S. Application Data

(63) Continuation-in-part of application No. 18/815,691, filed on Aug. 26, 2024.

(60) Provisional application No. 63/674,501, filed on Jul. 23, 2024.

(51) Int. Cl.
    *G06N 10/70*     (2022.01)
    *G06N 3/02*      (2006.01)
    *G06N 10/60*     (2022.01)

(52) U.S. Cl.
    CPC .............. *G06N 10/70* (2022.01); *G06N 3/02* (2013.01); *G06N 10/60* (2022.01)

(58) Field of Classification Search
    CPC ........... G06N 10/70; G06N 3/02; G06N 10/60
    See application file for complete search history.

(56) References Cited

U.S. PATENT DOCUMENTS

| | | | | | |
|---|---|---|---|---|---|
| 12,165,013 | B1 * | 12/2024 | Chamberland | ......... | G06F 11/08 |
| 2019/0044542 | A1 * | 2/2019 | Hogaboam | ............ | G06N 3/088 |
| 2019/0108161 | A1 | 4/2019 | Nagarajan | | |

| | | | | | |
|---|---|---|---|---|---|
| 2020/0342548 | A1 | 10/2020 | Mazed et al. | | |
| 2021/0391873 | A1 * | 12/2021 | Zheng | .................... | G06N 3/045 |
| 2022/0253742 | A1 * | 8/2022 | Zheng | .................... | G06N 10/70 |
| 2023/0177377 | A1 * | 6/2023 | Oh | ........................... | G06N 7/01 |
| | | | | | 716/100 |
| 2023/0306293 | A1 * | 9/2023 | Daimon | ................ | G06N 3/092 |
| 2023/0421363 | A1 | 12/2023 | Hill | | |

(Continued)

OTHER PUBLICATIONS

C. Kim, K. D. Park and J.-K. Rhee, "Quantum Error Mitigation With Artificial Neural Network," in IEEE Access, vol. 8, pp. 188853-188860, 2020 (Year: 2020).*

(Continued)

*Primary Examiner* — Cynthia Britt

(74) *Attorney, Agent, or Firm* — MALLOY & MALLOY, PL

(57)                  ABSTRACT

The present invention relates to a quantum computing system incorporating an advanced neural network for predictive error correction and system optimization. The neural network utilizes machine learning techniques, including deep learning and reinforcement learning, to analyze real-time data from a monitoring system comprising photonic sensors. The system dynamically adjusts high-frequency laser parameters and cryogenic cooling to maintain qubit coherence and prevent decoherence events. The neural network also integrates predictive models based on historical data and time-series analysis, enabling preemptive correction of potential errors during quantum operations. By refining its predictive capabilities and control over quantum operations, the system enhances computational accuracy and operational stability, making it particularly suitable for high-precision quantum applications.

20 Claims, 11 Drawing Sheets

(56)    References Cited

U.S. PATENT DOCUMENTS

| | | | | |
|---|---|---|---|---|
| 2024/0330732 | A1* | 10/2024 | Pisenti | .................... G06N 10/40 |
| 2025/0068953 | A1* | 2/2025 | Senior | .................... G06N 10/40 |
| 2025/0259085 | A1* | 8/2025 | Crabtree | ............... G06N 5/043 |

OTHER PUBLICATIONS

Zaman et "EQCNN: Enhanced Remote Sensing Imagery Classification with Circuit-Based Error-Corrected Quantum Convolutional Neural Networks," 2024 International Conference on Digital Image Computing: Techniques and Applications (DICTA), Perth, Australia, 2024, pp. 730-737 (Year: 2024).*
Y. S. Chong et al., "Lookup Table and Neural Network Based Decoders for Real Time Quantum Error Correction," 2024 21st International SoC Design Conference (ISOCC), Sapporo, Japan, 2024, pp. 91-92 (Year: 2024).*
Paracha et al. "Adaptive Quantum Readout Error Mitigation with Transfer Learning," 2024 15th International Conference on Information and Communication Technology Convergence (ICTC), Jeju Island, Korea, Republic of, 2024, pp. 506-511 (Year: 2024).*

* cited by examiner

100

100

168

Cryostat

Cryostor

Untane-low
Ultra-low tempertures
to stabiize
stuantum quboece

172

188

Liquid he
Jeqcuaifier

176

180

Heliun
leiqiuefier &
vacuom cham

Liquid hebos
stabiie

184

Liquid
hebotse

LEQUID
HEDIO

Ultuo qo
stab 104

Liquid qubotes
& reduce decohorece

Liquid hebits

QUANTUM COMPUTING SYSTEM WITH ADVANCED NEURAL NETWORK FOR PREDICTIVE ERROR CORRECTION

CLAIM OF PRIORITY

This application is a Continuation-in-Part of United States Non-Provisional Patent application Ser. No. 18/815,691, filed on Aug. 26, 2024, which in turn claims the benefit of U.S. Provisional Patent Application Ser. No. 63/674,501 filed on Jul. 23, 2024, which is incorporated by reference herein in its entirety.

Field of the Invention

The present invention relates to quantum computing systems, and more specifically to the incorporation of advanced neural network algorithms for real-time error correction and system optimization. The invention utilizes machine learning techniques such as deep learning, reinforcement learning, and unsupervised learning to enhance the predictive capabilities of the neural network. The system integrates predictive models based on historical data to anticipate and correct potential errors during quantum operations, thereby improving qubit coherence, stability, and overall system performance. This quantum computing system is particularly suited for applications requiring high accuracy and efficiency, such as cryptography, complex simulations, and large-scale data analysis.

DESCRIPTION OF THE RELATED ART

Quantum computing represents a paradigm shift in computational technology, offering the potential to solve complex problems that are currently intractable for classical computers. The fundamental advantage of quantum computers lies in their ability to exploit quantum phenomena, such as superposition and entanglement, to process information in ways that classical computers cannot. Unlike classical bits, which exist in a binary state of either 0 or 1, quantum bits, or qubits, can exist in multiple states simultaneously. This allows quantum computers to perform many calculations at once, leading to a potential exponential increase in computational power for certain types of problems.

The development of quantum computing has been marked by significant advancements over the past few decades, with various approaches being explored to build practical and scalable quantum systems. Early quantum computers have been developed using a range of technologies, including superconducting circuits, trapped ions, and topological qubits, among others. Each of these approaches has its own set of advantages and challenges, and researchers continue to explore the most effective ways to harness the power of quantum mechanics for computational purposes.

Despite the promise of quantum computing, several critical challenges have emerged that hinder the widespread adoption and practical use of this technology. One of the foremost challenges is maintaining qubit coherence. Qubits are inherently fragile and can easily lose their quantum state due to interactions with their environment. This phenomenon, known as decoherence, is caused by factors such as electromagnetic interference, thermal fluctuations, and mechanical vibrations. Decoherence leads to the loss of quantum information and introduces errors in quantum computations, which can severely limit the reliability and accuracy of a quantum computer. To mitigate decoherence, current quantum computing systems often operate at extremely low temperatures, close to absolute zero, using sophisticated cryogenic systems. These low temperatures help to minimize thermal noise and other environmental disturbances that can cause qubits to decohere. However, maintaining such low temperatures requires complex and costly infrastructure, making these systems expensive and difficult to scale. Moreover, even with cryogenic cooling, decoherence remains a persistent issue that limits the operational lifespan of qubits and, consequently, the complexity of computations that can be performed.

Another significant challenge in quantum computing is the precise control and manipulation of qubits. In superconducting quantum computers, qubits are typically formed from small circuits that can enter a quantum state. Controlling these qubits requires the application of precise electromagnetic pulses, which must be timed and calibrated with extreme accuracy to perform quantum operations. However, these operations are highly susceptible to errors due to factors such as timing jitter, cross-talk between qubits, and fluctuations in the control signals. As a result, the fidelity of quantum operations—an indicator of how accurately quantum gates perform—can be compromised, leading to computational errors.

Trapped ion quantum computers, another leading approach, offer longer coherence times compared to superconducting qubits, but they face challenges in scaling. Trapped ions are held in place using electromagnetic fields and manipulated using laser beams. While this approach provides excellent qubit stability, it is difficult to trap and manipulate a large number of ions simultaneously with the required precision. As the number of qubits in a system increases, the complexity of managing their interactions grows exponentially, making it challenging to scale these systems to the sizes required for solving practical problems. Error correction is another critical area where quantum computing faces significant hurdles. In classical computing, errors can be detected and corrected using well-established techniques that rely on redundancy and error detection codes. However, quantum error correction is far more complex due to the principles of quantum mechanics. The no-cloning theorem, which states that it is impossible to create an identical copy of an arbitrary unknown quantum state, complicates the implementation of traditional error correction methods. Furthermore, quantum systems are subject to continuous, probabilistic errors, making it challenging to apply error correction without introducing additional errors.

To address these challenges, quantum error correction schemes have been developed, such as the surface code, which uses a lattice of qubits to detect and correct errors. However, these schemes require a significant overhead in terms of the number of physical qubits needed to protect a single logical qubit, reducing the overall efficiency and scalability of quantum systems. This overhead is one of the major bottlenecks in the development of large-scale quantum computers, as it significantly increases the resource requirements for building a fault-tolerant quantum computer. Communication between qubits within a quantum system is another area where improvements are needed. Quantum computations often require qubits to exchange information rapidly and accurately. In traditional quantum architectures, this communication is facilitated by coupling qubits using resonators or through direct interactions. However, as the system scales up, the complexity of managing these interactions increases, leading to potential communication bottlenecks that can slow down computations and reduce the overall performance of the system.

The limitations in qubit communication are particularly evident in distributed quantum computing, where qubits located in different parts of the system must communicate efficiently to perform distributed quantum algorithms. Latency in qubit communication, caused by the time it takes for information to travel between qubits, can significantly impact the speed and accuracy of quantum computations. This latency is exacerbated in larger systems, where qubits may be physically distant from one another, requiring the development of advanced communication protocols that minimize delays and ensure reliable data transmission.

Given these challenges, the quantum computing community is actively seeking solutions that can overcome the limitations of current technologies. One promising approach is the development of new materials and structures that enhance qubit coherence and stability. For instance, materials with low susceptibility to environmental noise, such as topological insulators or certain types of superconductors, could be used to create qubits that are less prone to decoherence. Additionally, the exploration of alternative qubit designs, such as those based on silicon quantum dots or diamond nitrogen-vacancy centers, may offer new pathways to achieving robust and scalable quantum systems.

Improvements in qubit control and error correction are also critical for the advancement of quantum computing. The integration of machine learning and artificial intelligence into quantum systems offers a potential solution for optimizing quantum operations in real-time. By continuously monitoring the state of the quantum system and applying corrective measures as needed, AI-driven control systems could significantly reduce the error rates and enhance the fidelity of quantum operations.

Advances in quantum communication technologies are equally important for the development of scalable quantum computers. The use of photonic technologies, such as integrated optical circuits and quantum photonic networks, could enable faster and more reliable communication between qubits. These technologies offer the potential to transmit quantum information with low latency and high fidelity, overcoming some of the communication bottlenecks that currently limit the performance of quantum systems. In conclusion, while quantum computing holds immense promise, several significant challenges must be addressed to realize its full potential. Maintaining qubit coherence, achieving precise qubit control, developing effective quantum error correction methods, and enhancing qubit communication are all critical areas that require ongoing research and innovation. Addressing these challenges will pave the way for the next generation of quantum computers, capable of solving complex problems across a wide range of fields, from cryptography and drug discovery to artificial intelligence and materials science.

SUMMARY OF THE INVENTION

The present invention, the Supremacy Quantum Ru23-05Hx, is a state-of-the-art quantum supercomputer that integrates cutting-edge technologies such as twisted graphene, phosphorus atom qubits, photonic sensors, and neural networks into a unified and scalable system. This invention leverages the unique electronic properties of twisted graphene to enhance qubit coherence and stability, while employing advanced photonic and neural network technologies to enable real-time error correction and optimized qubit control. The Supremacy Quantum Ru23-05Hx is designed to overcome the limitations of current quantum computing systems by providing a robust, efficient, and highly scalable platform capable of executing complex quantum computations with unprecedented precision and speed.

Compared to prior art, the Supremacy Quantum Ru23-05Hx offers several significant advantages. First, the use of twisted graphene as a foundational material greatly reduces qubit decoherence, allowing for longer and more stable quantum operations. Additionally, the integration of photonic sensors and neural networks for real-time error correction and optimization drastically reduces error rates, enhancing the overall fidelity of quantum computations. Unlike conventional systems that struggle with scalability and qubit communication, the Ru23-05Hx employs a sophisticated laser communication network that ensures efficient data transmission between qubits, minimizing latency and improving computational speed. These innovations collectively provide a quantum computing platform that not only surpasses existing technologies in performance and reliability but also paves the way for practical applications in a wide range of industries, from molecular biology to cryptography and beyond.

In a first implementation of the invention, the quantum computing system may comprise a quantum processor that utilizes qubits positioned within a graphene-based environment, specifically a twisted graphene mesh film, which may enhance qubit coherence and stability. The system may include a laser system operating at ultra-high frequencies to minimize interference with the qubits, thereby potentially preserving their coherence during quantum operations. Additionally, the system may be equipped with an integrated monitoring system that can employ photonic sensors to detect changes in qubit topography, laser shadows for interference detection, and temperature sensors for monitoring the cryogenic environment. A control system, which May incorporate a neural network, can analyze real-time data from the monitoring system to optimize the operation of the laser system and cryogenic environment, potentially ensuring maximum qubit coherence and operational stability. This quantum computing system may be designed to perform quantum computations with improved coherence times and enhanced computational speed compared to conventional quantum systems.

In a second aspect, wherein the twisted graphene mesh film is formed by aligning two layers of graphene at a magic angle to enhance electronic properties and further reduce qubit decoherence.

In another aspect, wherein the qubits are phosphorus atoms precisely positioned within the twisted graphene mesh film.

In another aspect, wherein the laser system operates at a frequency of approximately 100 THz to minimize interference with the qubits.

In another aspect, wherein the laser system is configured to non-invasively interact with the qubits, preserving qubit coherence during quantum operations.

In another aspect, wherein the monitoring system includes a photonic sensor network configured to detect and monitor the quantum states of the qubits in real-time.

In another aspect, wherein the photonic sensor network is further configured to detect vibrations and position changes in the qubits.

In another aspect, wherein the monitoring system includes laser shadow detectors configured to detect interference patterns that may affect qubit coherence.

In another aspect, wherein the monitoring system includes temperature sensors configured to monitor and detect fluctuations in the cryogenic environment of the quantum processor.

In another aspect, wherein the control system is configured to inject cryogenic coolant into the quantum processor in response to detected temperature spikes, thereby preserving qubit coherence.

In another aspect, wherein the control system includes a neural network configured to analyze data from the monitoring system and optimize the operation of the laser system and cryogenic environment in real-time.

In another aspect, wherein the neural network is further configured to provide predictive adjustments to the laser system and cryogenic environment based on historical data and operational patterns.

In another aspect, wherein the graphene-based environment eliminates the need for separate wiring between qubits, utilizing the inherent conductivity of the graphene mesh.

In another aspect, wherein the coherence times of the qubits are between 500 to 1000 nanoseconds.

In another aspect, wherein the quantum computing system is capable of performing up to 1.6 sextillion operations per second.

In another aspect, wherein the quantum processor is housed in an ultra-high vacuum environment to further reduce external interference and enhance qubit stability.

In another aspect, wherein the system is configured to execute quantum algorithms with exponentially higher computational speed compared to conventional quantum computing systems.

In another aspect, wherein the quantum computing system is configured for use in complex simulations requiring high computational accuracy, such as molecular modeling or cryptography.

In another implementation of the invention, a method for performing quantum computations may be provided, wherein qubits are positioned within a twisted graphene mesh environment to enhance their coherence and stability. The method may involve operating a laser system at ultra-high frequencies to interact with the qubits while minimizing interference, thereby preserving their quantum states. During the computation process, an integrated monitoring system may continuously collect data on qubit topography, laser interference patterns, and temperature fluctuations. This data may be analyzed in real-time by a control system, potentially incorporating a neural network, which can adjust the laser system and cryogenic environment to maintain optimal qubit coherence. The method may enable the execution of quantum algorithms with improved accuracy and speed, providing significant computational advantages over traditional quantum computing methods.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENT

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
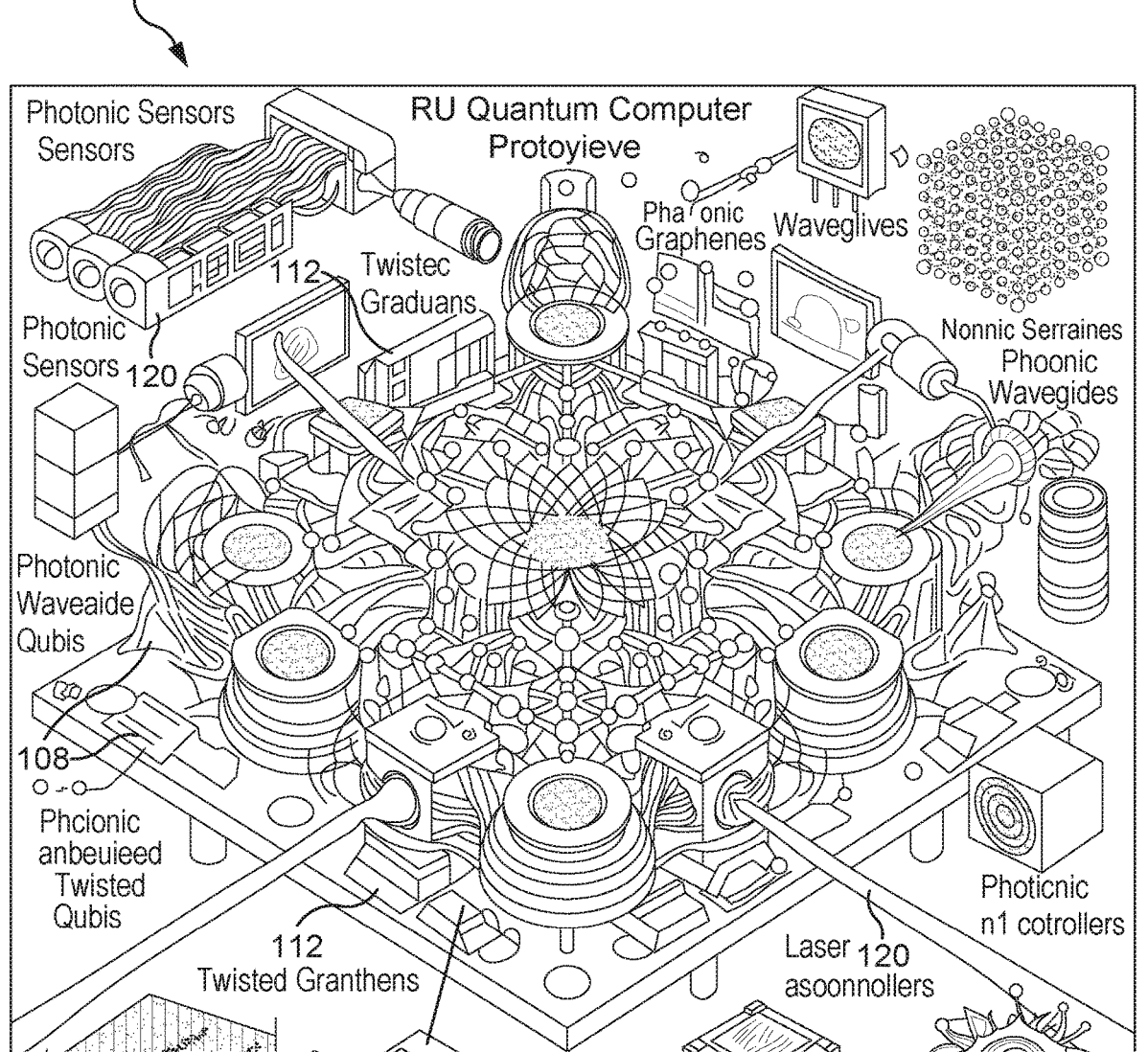
FIG. 1 illustrates a top perspective view of the quantum computing system, showing the arrangement of twisted graphene qubits, photonic waveguides, photonic sensors, laser controllers, and integrated circuits that collectively enhance qubit coherence and operational stability.
Figure 2:
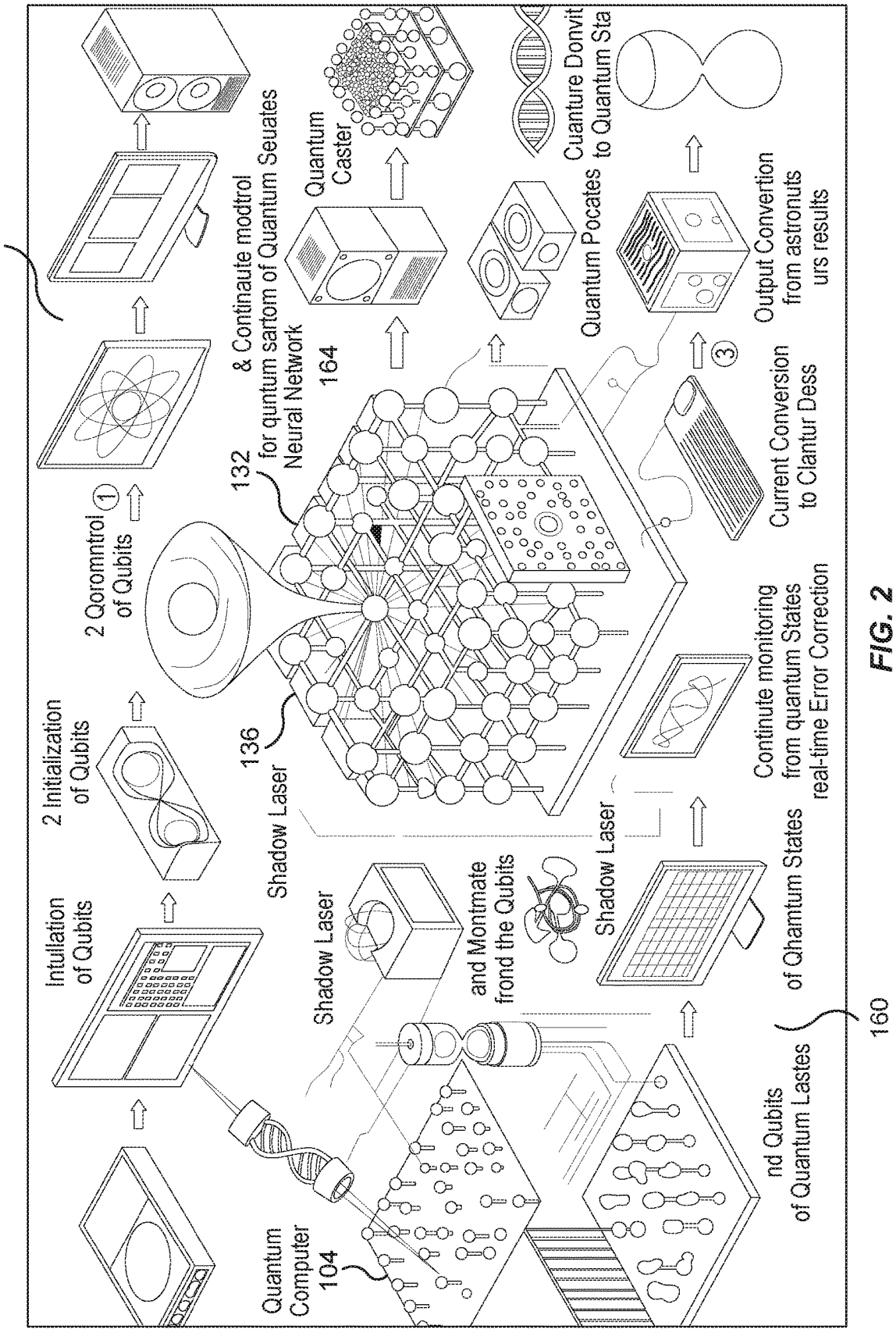
FIG. 2 illustrates a schematic flow diagram of the quantum computing system, detailing the process of qubit initialization, control, and continuous monitoring using shadow lasers and a neural network, which ensures real-time error correction and optimal quantum state management throughout quantum operations.

As shown throughout the figures, the present invention is a quantum computing system 100 designed to integrate advanced technologies such as twisted graphene qubits, photonic sensors, and a neural network-based control system into a unified and scalable platform. The quantum computing system 100 leverages the unique properties of twisted graphene structures 112 to enhance qubit coherence and stability, while employing high-frequency laser systems 132 and real-time monitoring systems 148 to optimize qubit performance during quantum operations. This invention may address the limitations of current quantum computing systems by providing a robust and efficient solution capable of executing complex quantum computations with improved precision and speed, as illustrated in FIG. 1.

Figure 4:
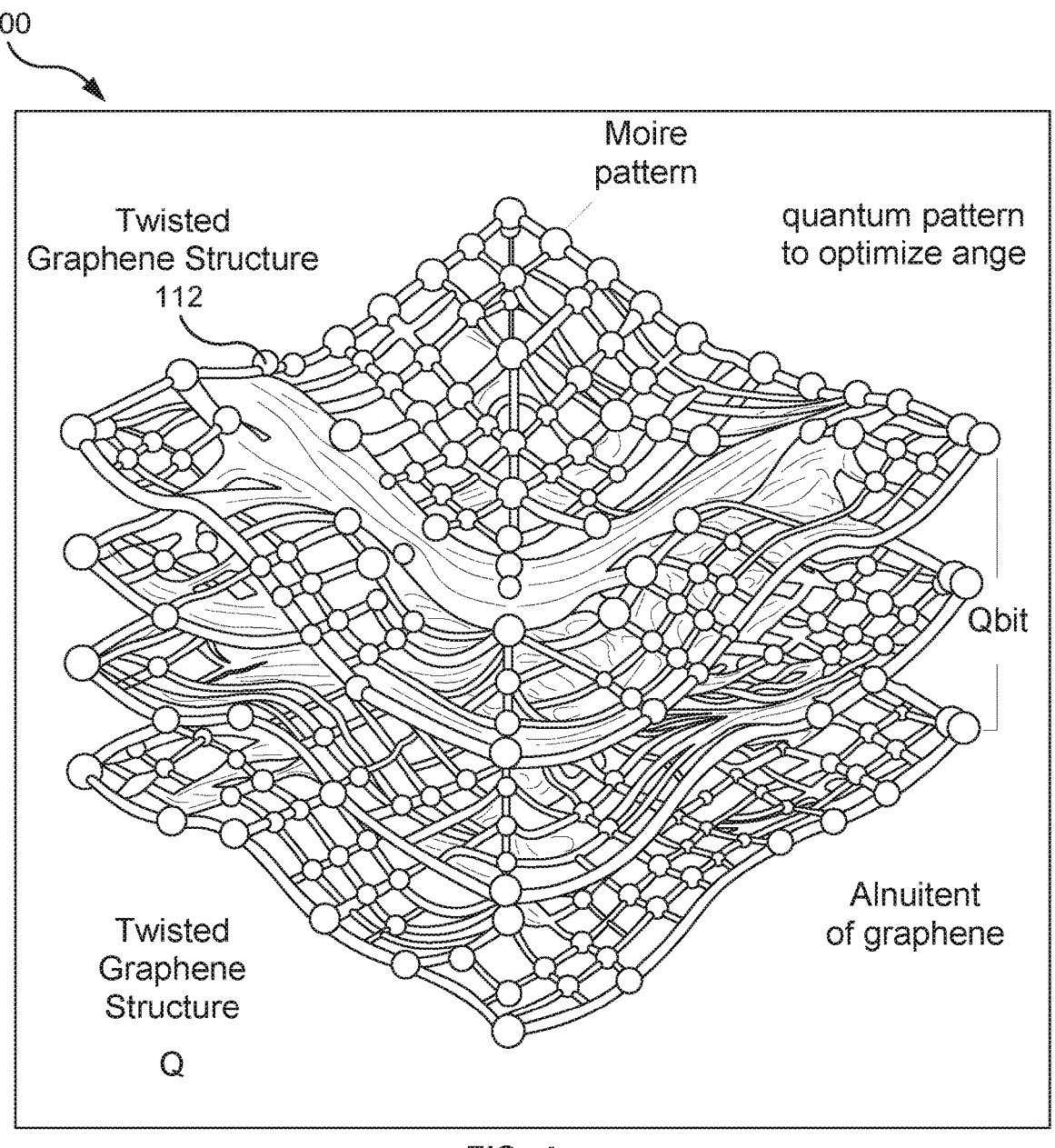
FIG. 4 illustrates a detailed view of the twisted graphene structure used in the quantum computing system, showing the layered configuration and the moiré pattern created by the alignment of graphene sheets at specific angles to optimize qubit positioning and enhance quantum coherence.
Figure 6:
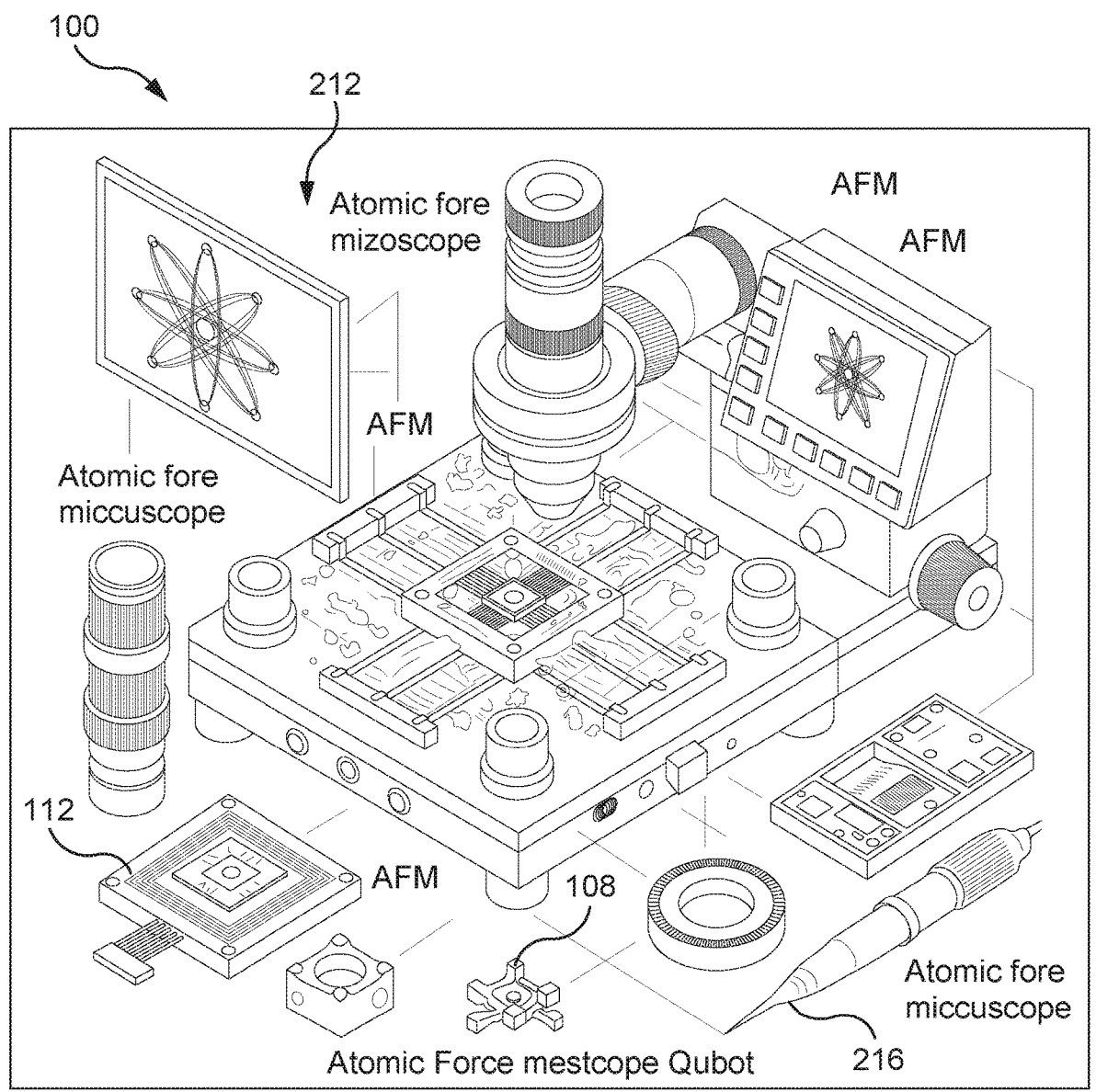
FIG. 6 illustrates a setup involving an atomic force microscope (AFM) used within the quantum computing system, detailing the components for precise qubit analysis, manipulation, and verification at the atomic level to ensure accurate placement and optimal performance of qubits within the quantum processor.

The quantum processor 104 of the quantum computing system 100 may comprise a plurality of qubits 108, which are positioned within a graphene-based environment, specifically a twisted graphene mesh film 112. This twisted graphene mesh film 112, as depicted in FIG. 4, is formed by aligning two layers of graphene at a magic angle, typically around 1.1 degrees, to enhance electronic properties and reduce qubit decoherence. The unique moiré pattern created by this alignment optimizes qubit positioning and enhances quantum coherence, which is crucial for the stable operation of the quantum computing system 100. The qubits 108 may be composed of phosphorus atoms, which are precisely positioned within the twisted graphene mesh 112 using advanced nanomanipulation techniques 216, as shown in FIG. 6. This configuration provides an ultra-stable quantum environment that significantly improves the coherence times of the qubits 108, making the system 100 highly efficient in performing quantum computations. Embodiments are envisioned wherein instead of a twisted graphene mesh, any other layered 2D materials exhibiting superconductivity, along with similar passive and non-obtrusive properties as twisted graphene, may be used.

Figure 5:
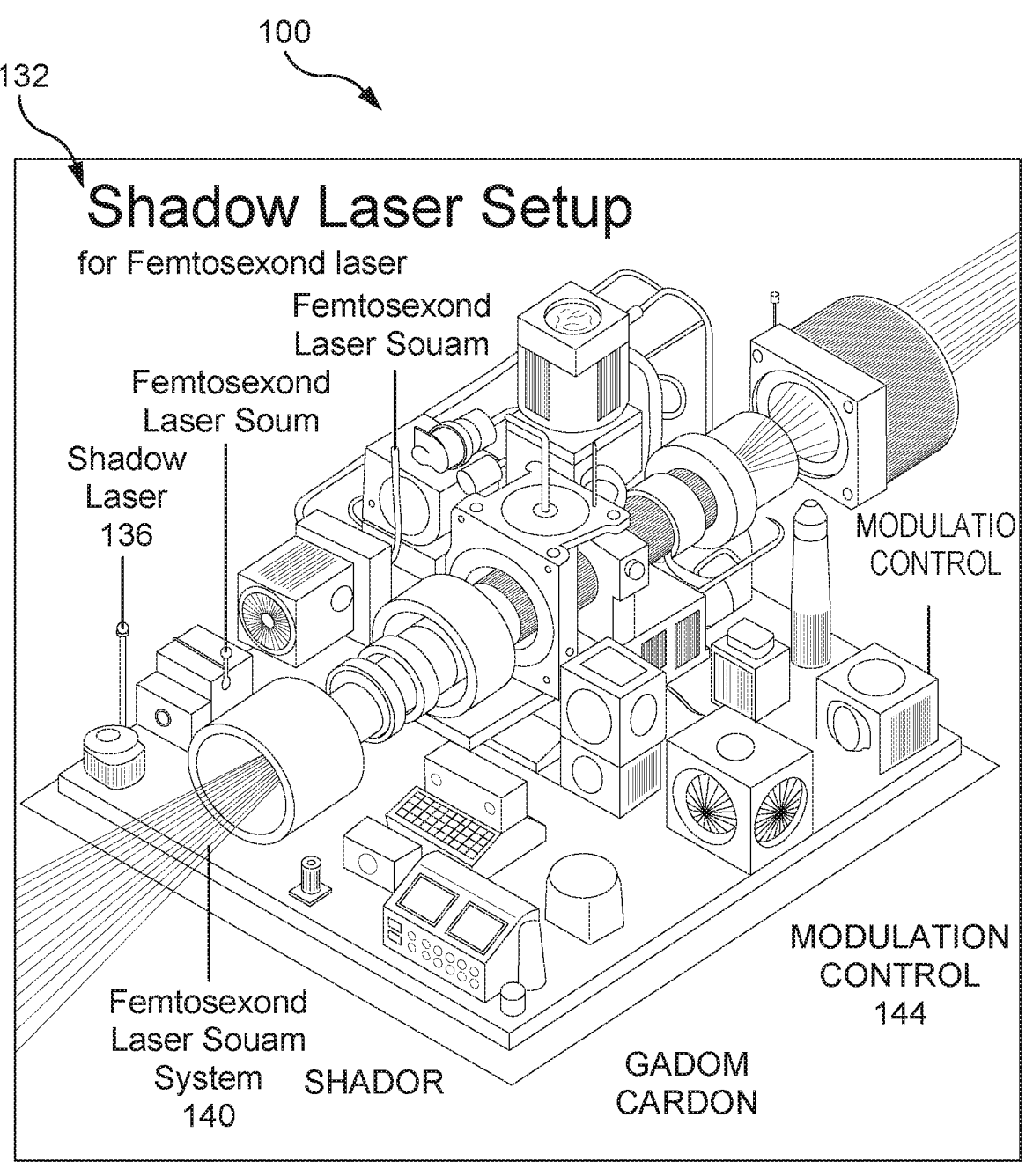
FIG. 5 illustrates a detailed view of the shadow laser setup within the quantum computing system, featuring the femtosecond laser system and modulation control components used to minimize interference and enhance qubit coherence during quantum operations.

The quantum computing system 100 may include a high-frequency laser system 132 designed to interact with the qubits 108 while minimizing interference that could disrupt their quantum states. As illustrated in FIG. 5, the laser system 132 operates at a frequency of approximately 100 THz, which is significantly higher than conventional laser systems, typically operating in the GHz range. This ultra-high frequency operation reduces the likelihood of external noise affecting the qubits 108, thereby preserving their coherence during quantum computations.

Figure 7:
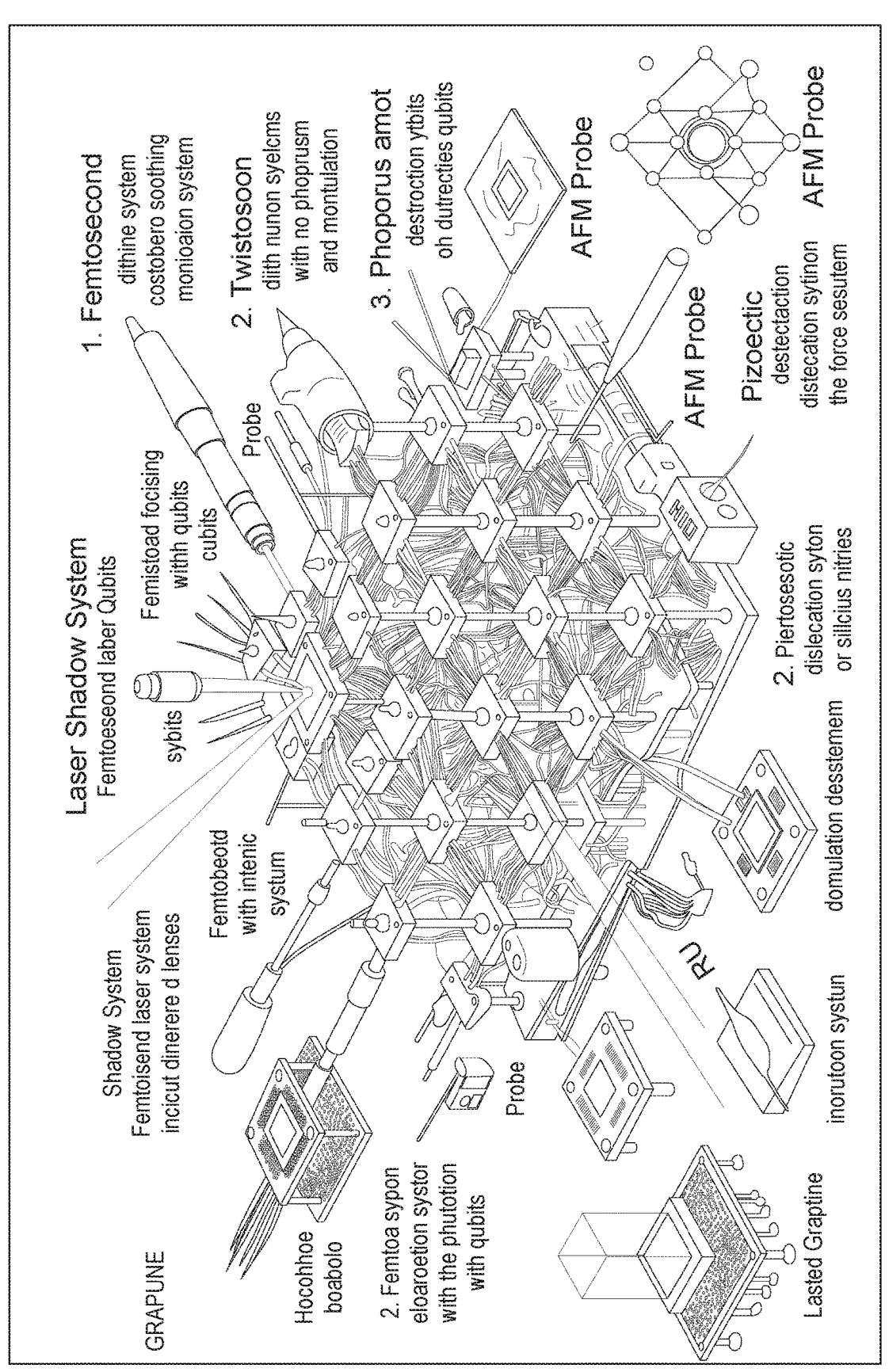
FIG. 7 illustrates the laser shadow system within the quantum computing system, showing the arrangement of femtosecond lasers, twisted graphene qubit platforms, and atomic force microscopy (AFM) probes used for precise qubit manipulation and real-time monitoring to ensure optimal qubit alignment and coherence.

The shadow laser setup 136 within the quantum computing system 100, depicted in FIG. 7, features femtosecond lasers 140 and modulation control components 144 used to fine-tune the interaction between the lasers and qubits 108. The shadow laser system 136 may also include real-time focusing and modulation capabilities, allowing precise control over the laser beams to ensure optimal qubit coherence and stability.

Figure 8:
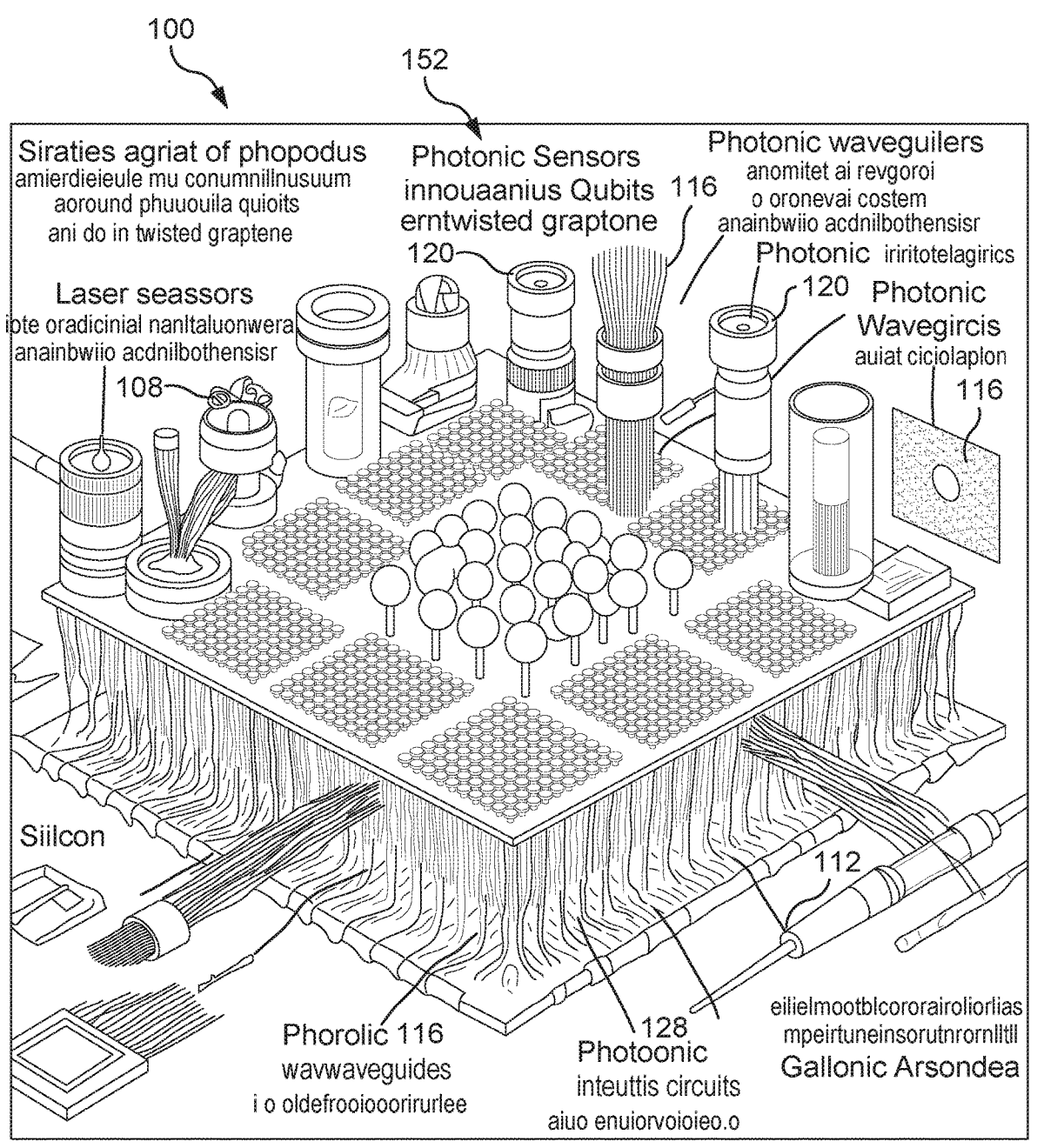
FIG. 8 illustrates the photonic sensor array within the quantum computing system, detailing the integration of photonic waveguides and sensors with qubits embedded in twisted graphene, all interconnected through photonic integrated circuits to facilitate high-speed data transmission and real-time qubit monitoring for enhanced computational accuracy and stability.

To support the precise operation of the quantum processor 104, the quantum computing system 100 may further comprise an integrated monitoring system 148, which may include a photonic sensor network 152 configured to detect and monitor the quantum states of the qubits 108 in real-time. As shown in FIG. 8, the photonic sensors 120 embedded in the twisted graphene structure 112 are interconnected through photonic waveguides 116 and photonic integrated circuits 128. These sensors 120 may detect various factors, including vibrations, position changes, and interference patterns that could impact qubit performance. The laser shadow detectors 156, depicted in FIG. 7, are another key component of the monitoring system 148. These detectors 156 are configured to detect laser interference patterns, also known as laser shadows, which may affect qubit coherence. The data collected by the photonic sensors 120 and laser shadow detectors 156 is continuously analyzed by the control system 160, which may incorporate a neural network 164.

Figure 11:
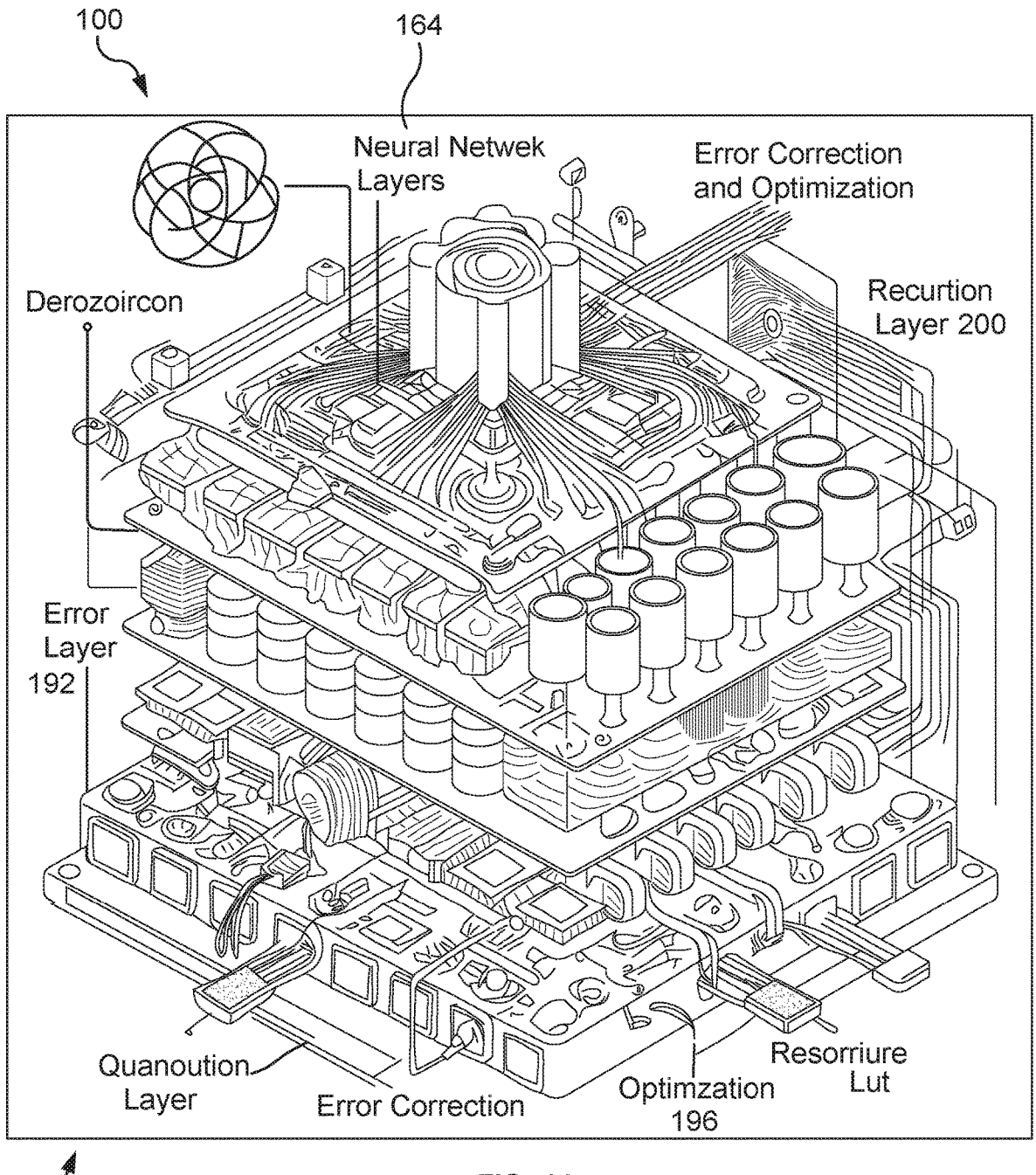
FIG. 11 illustrates the error correction and optimization architecture of the quantum computing system, highlighting the layered structure consisting of neural network layers, error correction layers, and optimization layers, all working together to detect, correct, and optimize quantum states in real-time, thereby ensuring the highest level of computational accuracy and stability.

The control system 160, which may include a neural network 164, is responsible for optimizing the operation of the quantum computing system 100 by analyzing real-time data from the monitoring system 148 and adjusting the laser system 132 and cryogenic cooling system 168 accordingly. As shown in FIG. 11, the neural network 164 may comprise multiple layers, including an error detection layer 192, an optimization layer 196, and a recursion layer 200. These layers work together to detect and correct errors proactively, thereby enhancing qubit fidelity and stability. The neural network 164 may also provide predictive adjustments based on historical data and operational patterns, ensuring that the quantum computing system 100 operates at peak efficiency.

Figure 9:
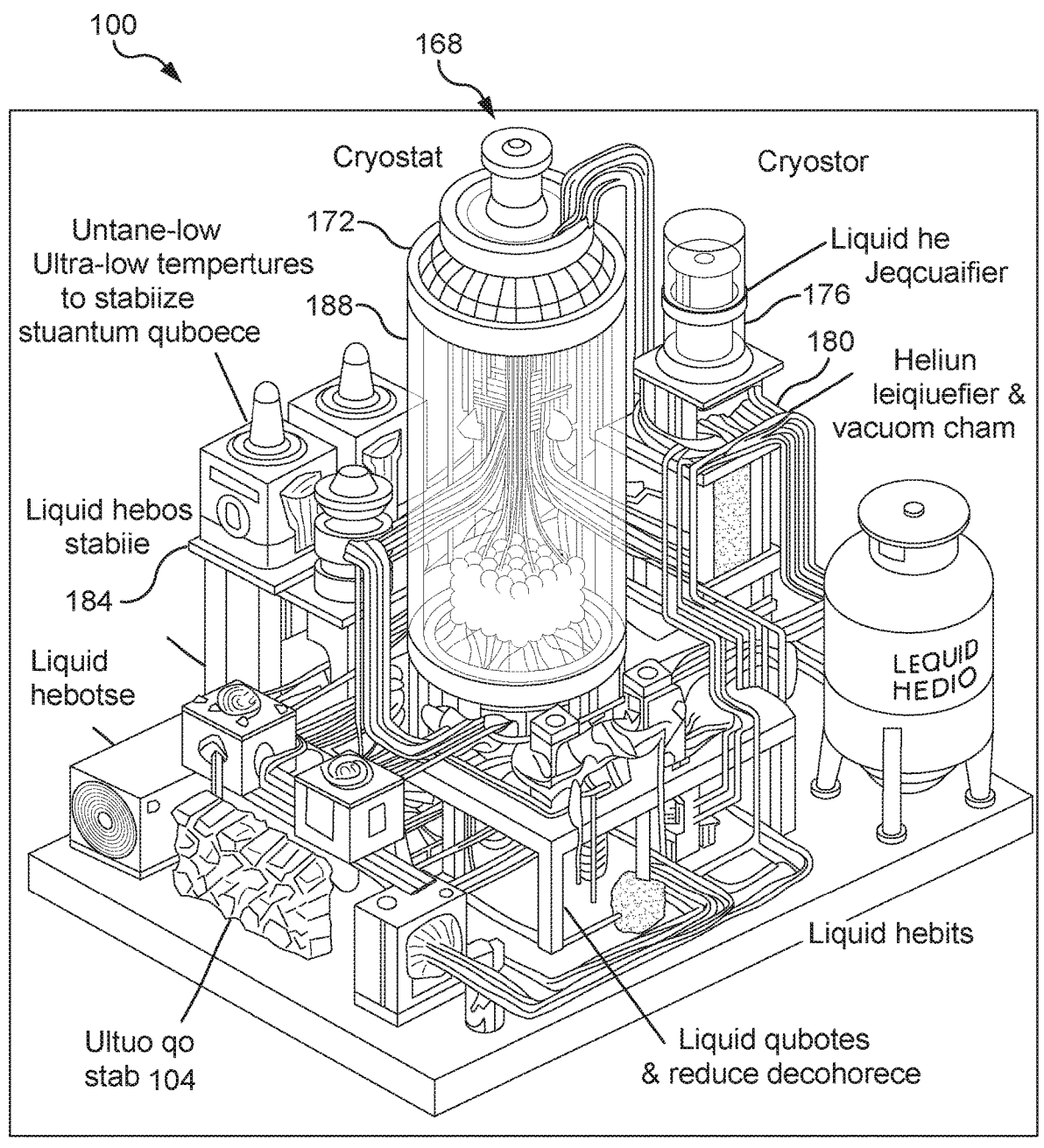
FIG. 9 illustrates the cryogenic cooling system within the quantum computing system, showing the arrangement of cryostats, helium liquefiers, and liquid helium circuits designed to maintain ultra-low temperatures, which stabilize qubits and reduce decoherence during quantum operations.
Figure 10:
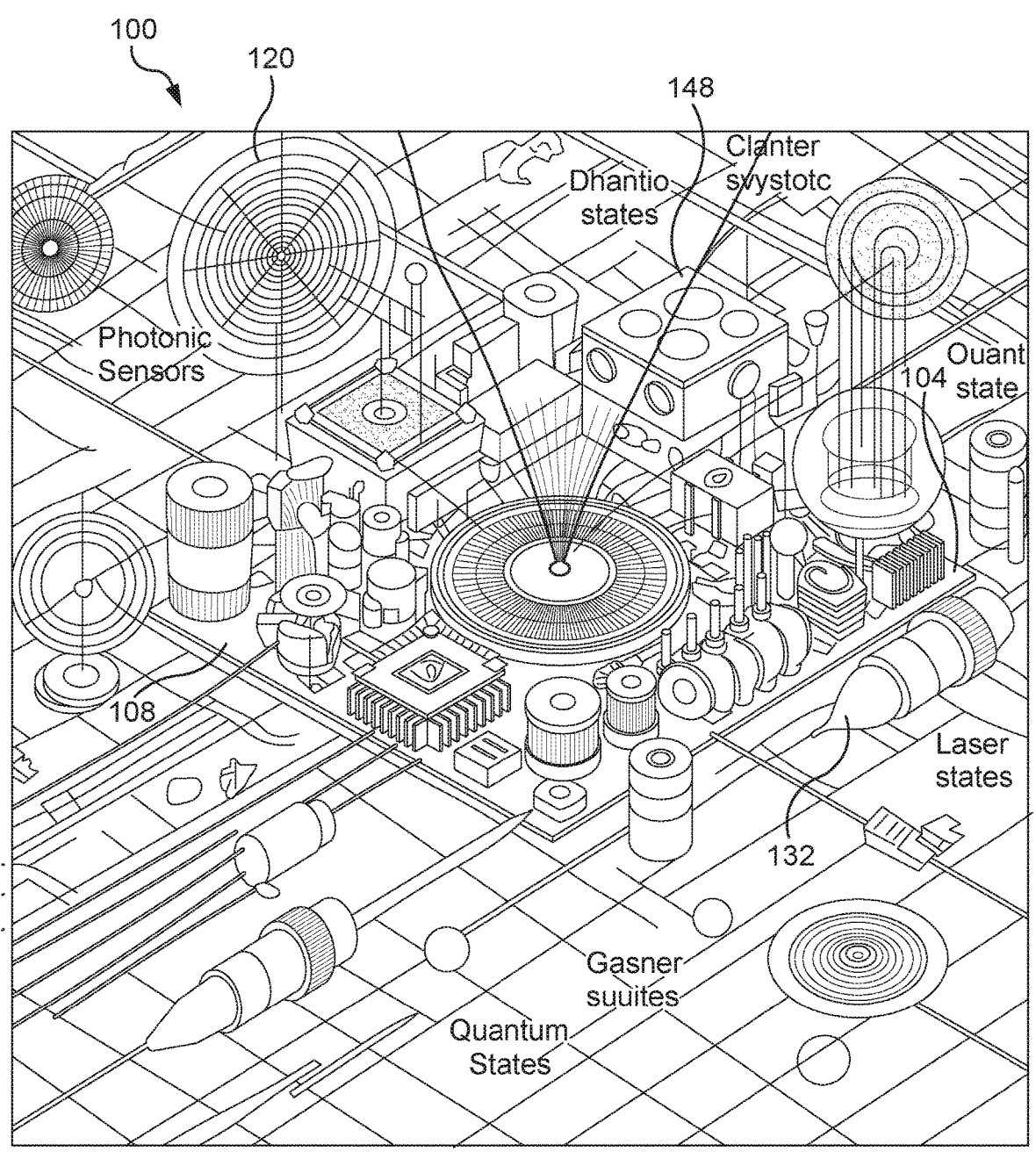
FIG. 10 illustrates a detailed view of the quantum computing system's core processing unit, showcasing the integration of photonic sensors, laser systems, and quantum states management components, all working together to optimize quantum computations and ensure high precision in the execution of quantum algorithms.

The quantum computing system 100 may be equipped with a sophisticated cryogenic cooling system 168, designed to maintain the quantum processor 104 at the ultra-low temperatures required for stable quantum operations. FIG. 9 illustrates the cryogenic cooling system 168, which comprises cryostats 172, helium liquefiers 176, and liquid helium circuits 180 designed to achieve and maintain temperatures close to absolute zero. The cryogenic cooling system 168 may minimize thermal noise and quantum decoherence, thereby extending the coherence times of the qubits 108.

Additionally, the cryogenic cooling system 168 may include vibration isolation platforms 184 to prevent external vibrations from affecting the qubits 108, as well as electromagnetic shielding 188 to protect the quantum processor 104 from electromagnetic interference, further ensuring the stability of the quantum operations.

Figure 3:
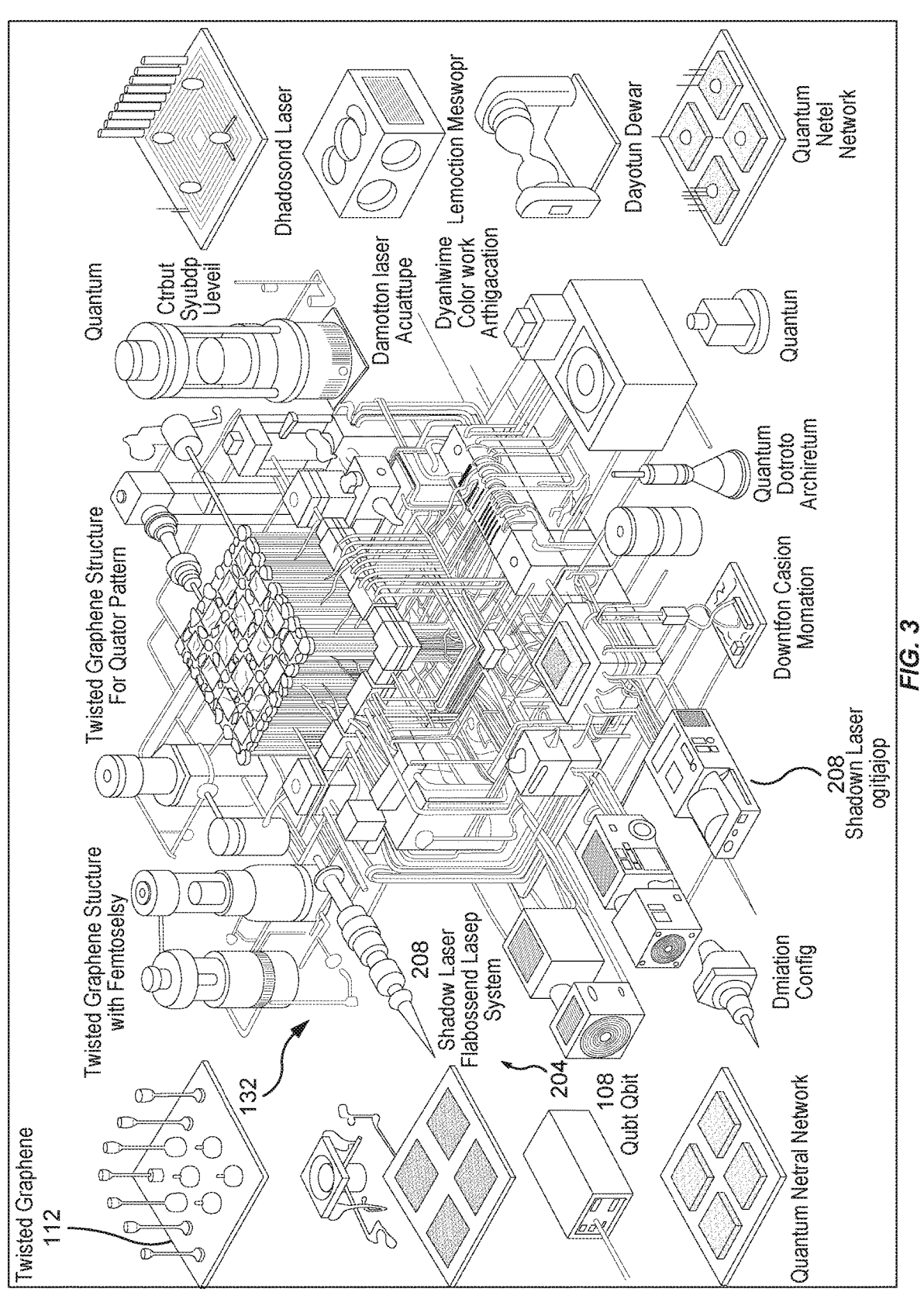
FIG. 3 illustrates a detailed view of the quantum computing system's architecture, highlighting the integration of twisted graphene structures, shadow lasers, quantum neural networks, and cryogenic cooling systems, all interconnected to optimize qubit performance, coherence, and stability.

The quantum computing system 100 may also utilize a qubit interconnection and laser communication network 204 to facilitate efficient data transmission between qubits 108 and the control system 160. As depicted in FIG. 3, the laser communication network 204 may employ shadow lasers 208, specifically designed to reduce latency and increase the accuracy of qubit interactions. The laser communication network 204 may incorporate advanced modulation techniques to ensure that data is transmitted with minimal loss and interference, thereby enhancing the overall performance of the quantum computing system 100.

The atomic force microscopy (AFM) setup 212 within the quantum computing system 100, illustrated in FIG. 6, may be used for the precise analysis, manipulation, and verification of qubits 108 at the atomic level. The AFM 212 may be employed during the fabrication process to ensure that phosphorus atoms are accurately positioned within the twisted graphene structure 112. This level of precision is essential for achieving optimal performance of the qubits 108 within the quantum processor 104. Nanomanipulation techniques 216 may be applied to correct any placement errors, ensuring that the qubits 108 are perfectly aligned within the twisted graphene mesh 112, thereby enhancing the overall stability and coherence of the quantum system 100.

The quantum computing system 100 may be capable of performing quantum computations with significantly improved coherence times and computational speed compared to conventional quantum systems. The qubits 108 in this system 100 may achieve coherence times ranging from 500 to 1000 nanoseconds, representing a substantial improvement over existing technologies. The quantum computing system 100 may be capable of performing up to 1.6 sextillion operations per second, making it suitable for a wide range of applications, including molecular biology, cryptography, aerospace, geological studies, and big data analysis.

The method of using the quantum computing system 100 may involve positioning qubits 108 within the twisted graphene mesh 112 to enhance their coherence and stability. The laser system 132 may be operated at ultra-high frequencies to interact with the qubits 108 while minimizing interference, thereby preserving their quantum states. During the computation process, the integrated monitoring system 148 may continuously collect data on qubit topography, laser interference patterns, and temperature fluctuations. The control system 160, potentially incorporating the neural network 164, may analyze this real-time data and adjust the laser system and cryogenic cooling system 168 to maintain optimal qubit coherence. This method may enable the execution of quantum algorithms with improved accuracy and speed, providing significant computational advantages over traditional quantum computing methods.

The quantum computing system 100 offers several advantages over prior art, particularly in its ability to integrate advanced materials and technologies into a single, scalable quantum computing platform. The use of twisted graphene 112 as a foundational material greatly reduces qubit decoherence, allowing for longer and more stable quantum operations. The integration of photonic sensors 120 and the neural network 164 for real-time error correction and optimization drastically reduces error rates, enhancing the overall fidelity of quantum computations. The sophisticated laser communication network 204 ensures efficient data transmission between qubits 108, minimizing latency and improving computational speed. These innovations collectively provide a quantum computing platform that not only surpasses existing technologies in performance and reliability but also paves the way for practical applications in various industries, from molecular biology to cryptography and beyond.

The quantum computing system 100 may be housed in an ultra-high vacuum environment to further reduce external interference and enhance qubit stability. This configuration, as depicted in FIG. 9, is particularly beneficial for maintaining the integrity of quantum operations over extended periods. The vacuum environment may be maintained by a combination of cryogenic pumps and vacuum chambers, ensuring that the quantum processor 104 remains isolated from external factors that could disrupt its operation.

The qubits 108, as described earlier, may be phosphorus atoms precisely positioned within the twisted graphene mesh 112. This precise positioning is crucial for the stable operation of the quantum computing system 100, as any misalignment could result in significant errors during quantum computations. The use of nanomanipulation techniques 216, as depicted in FIG. 6, allows for the correction of any placement errors, ensuring that the qubits 108 are perfectly aligned within the graphene mesh 112.

The neural network 164, which forms part of the control system 160, may play a crucial role in maintaining the stability and efficiency of the quantum computing system 100. By continuously analyzing data from the photonic sensors 120 and laser shadow detectors 156, the neural network 164 can make real-time adjustments to the laser system 132 and cryogenic cooling system 168, ensuring that the qubits 108 remain coherent and stable throughout the computation process. The neural network 164 may also provide predictive adjustments based on historical data, allowing the system 100 to preemptively correct potential errors before they impact the quantum operations.

The quantum computing system 100 may be designed to execute quantum algorithms with exponentially higher computational speed compared to conventional quantum systems. This increased speed is achieved through the integration of advanced materials, such as twisted graphene 112 and phosphorus atom qubits 108, and the use of high-frequency lasers 132 and photonic sensors 120 for real-time error correction and optimization. The system 100 may be capable of performing up to 1.6 sextillion operations per second, making it ideal for applications that require high computational accuracy, such as molecular modeling or cryptography. The quantum computing system 100 represents a significant advancement in the field of quantum computing, offering a scalable and highly efficient platform capable of addressing the limitations of current technologies. The integration of twisted graphene structures 112, high-frequency lasers 132, photonic sensors 120, and neural networks 164 may enable the quantum computing system 100 to achieve unparalleled performance in executing complex quantum computations. The detailed descriptions provided for each component and process underscore the innovative nature of this invention and its potential to revolutionize various industries through its advanced capabilities.

The method of using the quantum computing system 100 may involve several key steps. First, the qubits 108, composed of phosphorus atoms, may be positioned within the twisted graphene mesh 112 to enhance their coherence and stability. The laser system 132, operating at a frequency of approximately 100 THz, may then be used to interact with the qubits 108 while minimizing interference. During the quantum computation process, the integrated monitoring system 148 may continuously collect data on qubit topography, laser interference patterns, and temperature fluctuations. The control system 160, incorporating the neural network 164, May analyze this data in real-time and adjust the laser system 132 and cryogenic cooling system 168 to maintain optimal qubit coherence. This method may enable the quantum computing system 100 to execute quantum algorithms with improved accuracy and speed, providing significant computational advantages over traditional quantum computing methods.

Overall, the quantum computing system 100 offers a comprehensive solution to the challenges faced by existing quantum computing systems. By integrating advanced materials, such as twisted graphene 112 and phosphorus atom qubits 108, and employing high-frequency lasers 132, photonic sensors 120, and neural networks 164, the quantum computing system 100 may achieve significantly improved performance in executing complex quantum computations. This innovative design addresses the limitations of current quantum technologies, offering significant advantages over prior art and setting a new standard in the field of quantum computing. The quantum computing system 100 may be the ideal choice for applications requiring high computational accuracy, speed, and reliability, providing a valuable tool for advancing various industries, including molecular biology, cryptography, aerospace, and big data analysis.

Since many modifications, variations, and changes in detail can be made to the described preferred embodiments of the invention, it is intended that all matters in the foregoing description and shown in the accompanying drawings be interpreted as illustrative and not in a limiting sense.

Furthermore, it is understood that any of the features presented in the embodiments may be integrated into any of the other embodiments unless explicitly stated otherwise. The scope of the invention should be determined by the appended claims and their legal equivalents.

What is claimed is:

1. A quantum computing system for real-time error correction and performance optimization, comprising:
   a quantum processor including a plurality of qubits;
   a control system configured to manage quantum operations on the qubits;
   a neural network integrated with the control system, wherein then neural network is configured to:
      utilize advanced machine learning techniques, including deep learning, reinforcement learning, or unsupervised learning, to analyze real-time data from the quantum processor;
      predict and correct errors in the quantum operations by adjusting control parameters dynamically based on detected qubit state changes;
   a monitoring system configured to collect historical data on qubit behavior and system performance, wherein the neural network incorporates predictive models based on the historical data to anticipate potential system disruptions and optimize operational parameters; and further wherein
   the quantum computing system continuously refines its error correction protocols and operational performance through the neural network's adaptive learning algorithms.

2. The quantum computing system of claim 1, wherein the neural network employs deep learning algorithms to analyze complex qubit state interactions and optimize quantum operations.

3. The quantum computing system of claim 1, wherein the neural network utilizes reinforcement learning techniques to improve its error correction protocols by rewarding successful qubit corrections and penalizing failures.

4. The quantum computing system of claim 1, wherein the neural network applies unsupervised learning to detect unknown patterns in qubit behavior, improving the system's predictive capabilities.

5. The quantum computing system of claim 1, wherein the neural network is further configured to dynamically adjust qubit control parameters based on real-time feedback from photonic sensors integrated within the quantum processor.

6. The quantum computing system of claim 1, wherein the historical data used by the neural network includes qubit coherence times, error rates, and interference patterns, which are used to refine predictive error correction models.

7. The quantum computing system of claim 1, wherein the neural network continuously updates its predictive models based on new data collected during quantum operations, improving its accuracy in preventing system disruptions.

8. The quantum computing system of claim 1, wherein the control system is configured to execute error correction protocols preemptively, based on predictions from the neural network's machine learning models.

9. The quantum computing system of claim 1, wherein the neural network is further configured to adjust the frequency and amplitude of high-frequency lasers used in the quantum operations, optimizing qubit coherence and system performance.

10. The quantum computing system of claim 1, wherein the neural network includes a reinforcement learning algorithm that autonomously adjusts control parameters during quantum operations, learning from historical successes and failures.

11. The quantum computing system of claim 1, wherein the neural network's predictive error correction model is based on statistical analysis of qubit state transitions, interference data, and operational noise patterns.

12. The quantum computing system of claim 1, wherein the neural network incorporates time-series analysis to anticipate qubit decoherence events and adjusts operational parameters in advance.

13. The quantum computing system of claim 1, wherein the system is further configured to adjust cryogenic cooling parameters in response to real-time feedback from the neural network to reduce thermal noise and improve qubit coherence.

14. The quantum computing system of claim 1, wherein the neural network is trained using a dataset of historical quantum operations and error patterns, allowing it to improve its predictive capabilities over time.

15. The quantum computing system of claim 1, wherein the neural network applies transfer learning techniques to use knowledge gained from prior quantum operations to optimize the performance of new qubit configurations.

16. The quantum computing system of claim 1, wherein the system includes a neural network-based predictive maintenance module, which anticipates hardware failures and adjusts operational parameters to prevent disruptions.

17. The quantum computing system of claim 1, wherein the neural network is further configured to analyze external environmental factors, such as electromagnetic interference, and adjust quantum operations to mitigate their effects.

18. The quantum computing system of claim 1, wherein the neural network adjusts qubit entanglement protocols in real-time based on predictive models that optimize entanglement coherence and stability.

19. A quantum computing system for enhanced qubit control for predictive error correction, comprising: a quantum processor including a plurality of qubits;
   a control system configured to manage quantum operations on the qubits;
   a neural network integrated with the control system, wherein then neural network is configured to:
      predict qubit decoherence events using historical data on qubit coherence times and error rates;
      preemptively adjust control parameters based on predictions of system disruptions to maintain qubit coherence;
   a monitoring system comprising photonic sensors, wherein the neural network analyzes real-time data from the sensors to continuously refine its predictive models; and further wherein the quantum computing system continuously refines its error correction protocols and operational performance through the neural network's adaptive learning algorithms.

20. A quantum computing system for predictive error correction and qubit optimization, comprising:

a quantum processor including a plurality of qubits;

a control system configured to manage quantum operations on the qubits;

a neural network integrated with the control system, wherein then neural network is configured to:

dynamically adjust the frequency and amplitude of high-frequency lasers based on real-time feedback from photonic sensors;

utilize time-series analysis of historical qubit behavior data to preemptively prevent decoherence events;

predict and correct potential errors during quantum operations by adjusting cryogenic cooling parameters to reduce thermal noise and maintain qubit stability;

a monitoring system comprising photonic sensors, wherein the neural network analyzes real-time data from the sensors to continuously refine its predictive models; and further wherein the quantum computing system continuously refines its error correction protocols and operational performance through the neural network's adaptive learning algorithms.

\* \* \* \* \*